United States Patent [19]

Gallagher et al.

[11] Patent Number: 5,483,612
[45] Date of Patent: Jan. 9, 1996

[54] INCREASED CAPACITY OPTICAL WAVEGUIDE

[75] Inventors: Daniel Gallagher, Big Flats; Daniel A. Nolan, Corning; David K. Smith; J. Richard Toler, both of Painted Post; Grant P. Watkins, Corning, all of N.Y.

[73] Assignee: Corning Incorporated, Corning, N.Y.

[21] Appl. No.: 323,795

[22] Filed: Oct. 17, 1994

[51] Int. Cl.$^6$ ................................................ G02B 6/22
[52] U.S. Cl. ........................... 385/127; 385/124; 385/128
[58] Field of Search ................................... 385/127, 128, 385/124, 125, 126

[56] References Cited

U.S. PATENT DOCUMENTS 4,715,679  12/1987  Bhagavatula ........................... 385/127

Primary Examiner—John D. Lee
Assistant Examiner—Phan T. H. Palmer
Attorney, Agent, or Firm—William J. Chervenak

[57] ABSTRACT

An compound core optical waveguide fiber designed for high data rate or single channel or WDM systems which may include optical amplifiers. The waveguide is characterized by a core having two or three regions wherein the refractive index can be varied. The relative size of the regions may also be varied. By adjusting these variables, the desired mode field diameter, zero dispersion wavelength, dispersion slope and cut off wavelength were obtained. The optical properties are chosen to limit non-linear effects while maintaining low attenuation and acceptable bend performance. In addition, the residual stress within the waveguide is maintained at a low level to limit stress induced birefringence. The low residual stress in the uncoated waveguide, together with a dual coating system having selected moduli and glass transition temperatures results in low polarization mode dispersion.

13 Claims, 2 Drawing Sheets

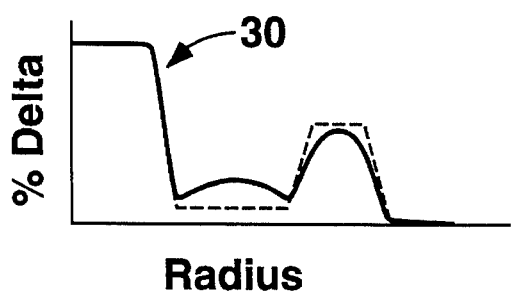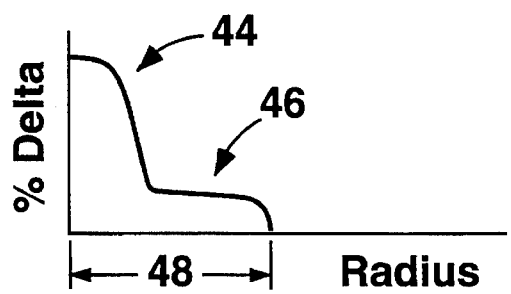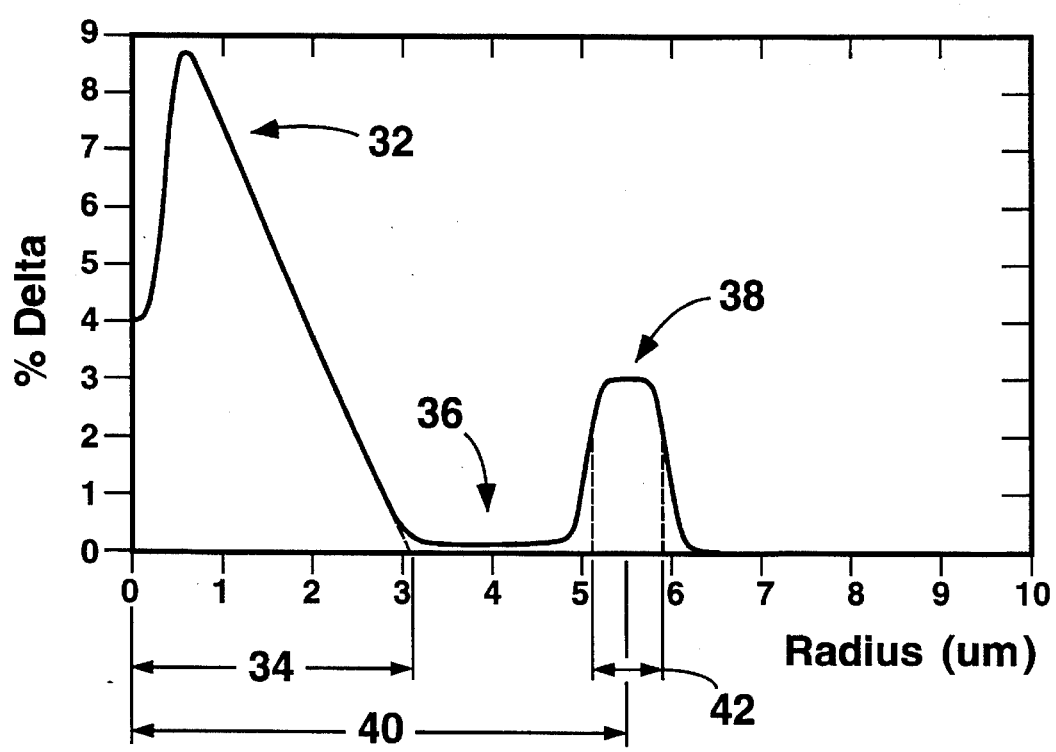

INCREASED CAPACITY OPTICAL WAVEGUIDE

BACKGROUND

The invention relates to an optical waveguide fiber designed for long distance, high bit rate telecommunications. In addition, the waveguide fiber is designed for long distance, high bit rate systems which use one or more optical amplifiers.

Telecommunication systems using high powered lasers, high data rate transmitters and receivers, and wavelength division multiplexing (WDM) technology require optical waveguide fiber having exceptionally low, but non-zero, total dispersion, and exceptionally low polarization mode dispersion (PMD). In addition, the waveguide fiber must have characteristics which essentially eliminate non-linear phenomena such as self phase modulation (SPM) and four wave mixing (FWM). The SPM can be limited by lowering power density. The FWM is controlled by operating in a wavelength range whereat dispersion is non-zero.

A further requirement is that the optical waveguide be compatible with long length systems incorporating optical amplifiers.

To provide an optical waveguide having the characteristics required for these sophisticated systems, a variety of refractive index profiles have been modelled and tested. The compound core design, discussed in U.S. Pat. No. 4,715,679, Bhagavatula, offers the flexibility to meet the new system requirements while maintaining the basic requirements such as low attenuation, narrow geometry tolerances, acceptable bending resistance, and high tensile strength. Furthermore, certain of the compound core designs are relatively easy to manufacture, thereby providing enhanced optical waveguide performance without prohibitive cost increases.

Translating these requirements into optical waveguide parameters, an optical waveguide suitable for high data rate and WDM systems and compatible with systems using optical amplifiers, are characterized by:

- a mode field diameter sufficiently large to limit SPM;
- low residual stress and tight control of core and clad roundness and concentricity and coating uniformity to limit PMD;
- proper choice of coating modulus and glass transition temperature to limit externally induced stress birefringence;
- an absolute value of total dispersion in the WDM window sufficiently high to prevent FWM but low enough to limit the dispersion power penalty; and,
- an absolute value of total dispersion and zero dispersion wavelength compatible with operation in the optical amplifier gain peak wavelength region.

DEFINITIONS

The following definitions are in accord with common usage in the art.

- The terms refractive index profile and index profile are used interchangeably.
- The radii of the regions of the core are defined in terms of the index of refraction. A particular region begins at the point where the refractive index characteristic of that region begins and ends at the last point where the refractive index is characteristic of that region. Radius will have this definition unless otherwise noted in the text.
- The initials PMD represent polarization mode dispersion.
- The initials WDM represent wavelength division multiplexing.
- The initials SPM represent self phase modulation, the phenomenon wherein portions of a signal above a specific power level travel at a different speed in the waveguide relative to portions of the signal below that power level.
- The initials FWM represent four wave mixing, the phenomenon wherein two or more signals in a waveguide interfere to produce signals of different frequencies.
- The term, % delta, represents a relative measure of refractive index defined by the equation,
  % delta=$100 \times (n_r^2 31 n_c^2)/2n_r^2$, where $n_r$ is the maximum refractive index in region 1 and $n_c$ is the refractive index in the cladding region.
- The term alpha profile refers to a refractive index profile, expressed in terms of % delta(r), which follows the equation,
  % delta(r)=% delta($r_o$)$(1-[(r-r_o)/(r_1-r_o)]^{alpha})$, where r is in the range $r_o \leq r \leq r_1$, delta is defined above, and alpha is an exponent which defines the profile shape.
- The profile volume is defined as integral from $r=r_i$ to $r=r_j$ of the quantity [(% delta(r))(r dr)].

SUMMARY OF THE INVENTION

The present invention meets the requirements, outlined above, for an optical waveguide for use in high data rate systems which may include WDM systems and incorporate optical amplifiers.

The invention is a particular species, discovered to have extraordinary properties, of a genus of profiles disclosed in U.S. Pat. No. 4,715,679, Bhagavatula, incorporated herein by reference.

A first aspect of the invention is a single mode optical waveguide fiber designed for high data rate or WDM systems which may incorporate optical amplifiers. The waveguide has a core region and a surrounding clad layer of index $n_c$. The core region includes a central region having a maximum index $n_0$, a first annular region adjacent the central region having maximum refractive index $n_1$, and a second annular region, adjacent the first annular region, having maximum index $n_2$, and $n_0 > n_2 > n_1$. The inventive fiber is characterized by:

- the profile volume from the centerline to the cross over radius, the inner profile volume;
- by the profile volume from the cross over radius to the end of the core, the outer profile volume; and,
- by the ratio of outer to inner profile volume. The inner profile volume, outer profile volume and ratio of outer to inner profile volume are in the ranges of about 2.70 to 3.95 units, 1.10 to 7.20 units and 0.30 to 2.35, respectively. The units are % delta-microns$^2$. The waveguide has a dual layer coating to preserve waveguide fiber strength and to substantially isolate the waveguide from external forces which can cause birefringence, thereby limiting polarization mode dispersion. The dual layer coating comprises an inner layer having an elastic modulus in the range of about 1.0 to 3.0 MPa and a glass transition temperature no greater than about −10° C. Some coatings, such as a silicone, are known to have a glass transition temperature no greater than −180° C. Acrylate coatings with glass transition temperature in the range of −30° C. to −40° C. are known. For the inner layer a lower transition temperature is better.

The outer layer has a modulus greater than about 400 MPa. In general, a higher modulus outer layer provides better protection from abrasion, puncture and bending due to external forces. However, practical considerations, such as coating strippability, resistance to cracking, and toughness, place an upper limit on outer layer modulus believed to be about 1600 MPa. Glass transition temperature of the outer coating layer is less critical than that of the inner coating. Outer coating glass transition temperature can range to 60° C. and above.

The cross over radius is found from the dependence of power distribution in the signal as signal wavelength changes. Over the inner volume, signal power decreases as wavelength increases. Over the outer volume, signal power increases as wavelength increases. For the profiles contained herein, the cross over radius is about 2.8 microns.

In an embodiment of the inventive optical waveguide, the central core region is characterized by an alpha index profile. Specific embodiments include index profiles having alpha values of at least 1. For the alpha=1 profile, the preferred embodiment includes limitations on the ratios $a_0/a$ and $a_1/a$, where $a_0$ is the central core radius, $a_1$ is the inner radius of the second annulus, and a is the radius extending to the interface of core and clad. The preferred ratios are $a_0/a$ no greater than about 0.4 and $a_1/a$ about 0.9.

Profiles having alpha values of 2, and infinity were also studied in detail. An alpha value of infinity means the index profile is constant. In practical terms, an alpha greater than about four approximates a constant profile.

In a second aspect of the invention, the core and clad regions are defined as in the first aspect above and the central core region has an alpha profile and the first annular region has a constant profile. As in the first aspect, the maximum refractive indices in each region have relative values, $n_0>n_2>n_1$. The inner and outer profile volume and the ratio of outer to inner volume are as in the first aspect.

In an embodiment of this second aspect, the central core region has an alpha of 2, a % delta in the range of about 0.80 to 0.95, and a radius in the range of about 2.4 to 2.8 microns. The first annular region has a % delta no greater than about 0.1. The second annular region has a % delta in the range of about 0.1 to 0.5, a radius, measured to the center of the second annular region, in the range of about 4.25 to 5.75, and a width, measured at the one half % delta level, of about 0.4 to 2 microns. The respective inner profile volume, outer profile volume and outer to inner profile volume ratio are in the ranges of about 2.75 to 3.70, 1.55 to 6.85, and 0.55 to 2.00.

In yet another embodiment of this second aspect, the central region has an alpha of infinity, i.e., the profile is essentially constant over this region, a % delta in the range of about 0.75 to 1.05, and a radius in the range of about 1.4 to 2.2 microns. The first annular region has a % delta no greater than about 0.2 and a radius in the range of about 3.25 to 5.55 microns. The second annular region has a % delta in the range of about 0.1 to 0.5 and a width, measured at the one half % delta level, of about 0.4 to 2 microns. The respective inner profile volume, outer profile volume and outer to inner profile volume ratio are in the ranges of about 1.38 to 1.84, 0.77 to 3.41, and 0.56 to 1.99.

A third aspect of the invention is a single mode optical waveguide fiber having a central core and a first and second annular region and a cladding layer as defined in the first aspect. The inner profile volume, outer profile volume and ratio of outer to inner profile volume are in the respective ranges of about 2.70 to 3.95 units, 1.10 to 7.20 units and 0.30 to 2.35. The waveguide fiber has a mean mode field diameter of about 8.4 microns, a zero dispersion wavelength in the range of about 1560 to 1575 nm, a dispersion slope no greater than about 0.09 ps/nm$^2$-km. and a polarization mode dispersion no greater than about 0.15 ps/km$^{1/2}$.

A fourth aspect of the invention is a single mode optical waveguide fiber having a central region of maximum refractive index $n_0$ and an adjacent annular region having an outside radius in the range of about 4 to 7 microns and a substantially constant % delta index no greater than about 0.16. The waveguide fiber has a mean mode field diameter of about 8.4 microns, a zero dispersion wavelength in the range of about 1560 to 1575 nm, a dispersion slope no greater than about 0.09 ps/nm$^2$-km and a polarization mode dispersion no greater than about 0.15 ps/km$^{1/2}$.

In a preferred embodiment of this fourth aspect, the central core has an alpha profile wherein alpha is at least 1.

BRIEF DESCRIPTION OF THE DRAWINGS

FIG. 5 is an embodiment of the invention wherein the central core has an alpha profile with alpha=infinity, i.e. the central profile is substantially constant.

FIG. 6 is an index profile used in the model calculations of waveguide properties.

FIG. 7 illustrates the special case of the compound profile wherein $n_1=n_2$.

DETAILED DESCRIPTION OF THE INVENTION

The characteristics of a waveguide fiber suitable for high performance telecommunications systems, described above, may be summarized as:

mode field diameter having a mean value of at least about 8.4 microns to reduce the power density in the waveguide and thereby reduce SPM;

zero dispersion wavelength in a range of about 1560 to 1575 nm combined with a dispersion slope below about 0.09 ps/nm-km to allow for WDM with sufficient total dispersion to prevent FWM but low enough total dispersion over the optical amplifier gain peak to allow essentially equal signal to noise ratio of the amplified WDM signals;

geometry tolerances narrow enough to limit PMD; and, a coating system having a low modulus inner layer and a high modulus outer layer to prevent external forces from introducing stress into the fiber, thereby asymmetrically altering the index profile and giving rise to PMD. Elastic modulus discussed herein is measured on film samples.

Figure 1:
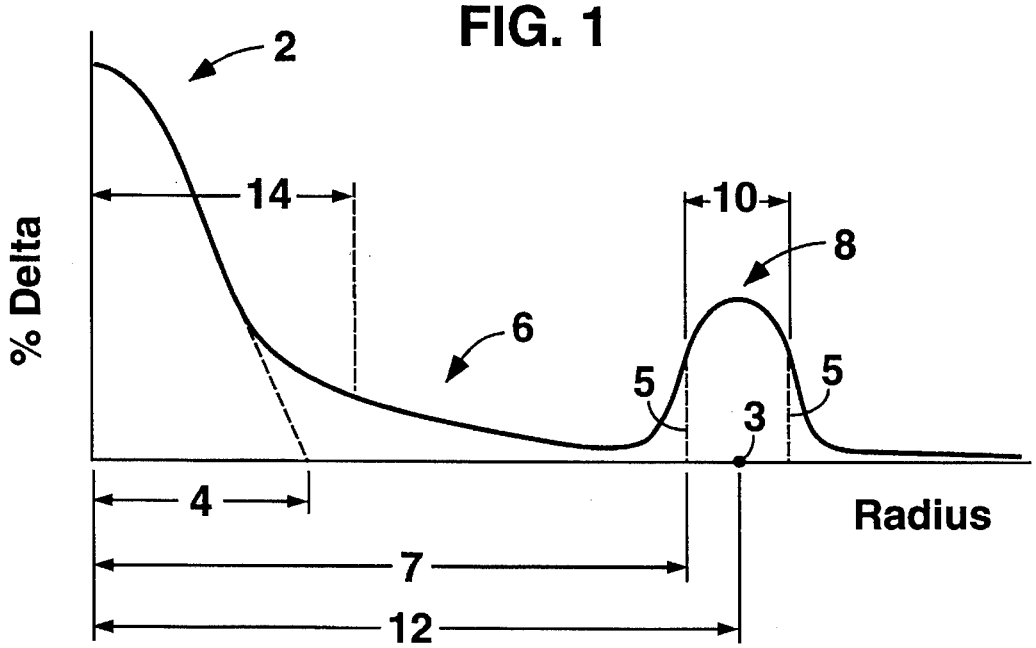
FIG. 1 is an illustrative chart of the inventive index profile showing the three regions of the compound core.

The compound core design shown in FIG. 1 has sufficient flexibility to meet this set of requirements. The concept of a compound core was disclosed in detail in the '679 patent referenced above. What has been accomplished in the invention described herein, is the identification of a set of compound core profiles which meet the requirements of a high performance telecommunications system. Further, the requirement set is met without increasing attenuation, while maintaining residual internal waveguide stress relatively low, and while maintaining acceptable bend performance.

The three core regions in which the profile can be adjusted are indicated as 2, 6, and 8 in FIG. 1. In each region, the shape of the index profile may take a general shape depending upon radial position. Also the radial extent of each region may be changed. As illustration, the radius of central core region 2 is shown as length 4. In this case, and for all modelled cases, that the central core radius is measured from the axial centerline to the intersection of the extrapolated central profile with the x axis.

The first annular region 6 is delimited by the radius 4 and the radius 7, which extends to vertical line 5 drawn from the half index point of the second annular region. The characteristic radius of the second annular region 8 is chosen as length 12, which extends from the core center to the midpoint of the base of region 8, as indicated by point 3. This convention for second annulus radius is used in all modelled cases. A convenient profile measure for symmetrical profiles is the width 10 shown between vertical lines 5. Lines 5 depend from the half-maximum % delta index points. This convention for second annulus width is used in all modelled cases.

The cross over radius is shown as length 14 in FIG. 1. The profile volume, in units of % delta-microns$^2$, inside the cross over radius is the inner profile volume. The profile volume outside the cross over radius is the outer profile volume. The outer to inner volume ratio is a measure of the relative power distribution at a given wavelength and thus is a measure of the effect of a particular index profile change.

The number of profiles achievable in practice using the three region core illustrated in FIG. 1 is essentially infinite. Thus, a model was developed to identify those profiles which met the system requirements stated above. The model uses equations and concepts known in the art.

For each modelled index profile, where the index profile is described by the function n(r), where n is refractive index and r is radius, numerical solutions of the scaler wave equation were found. Solutions were found at several wavelengths. The solutions yield propagation constants and field amplitudes from which the optical properties of the waveguide may be calculated from published formulas. For example, see, "Optical Waveguide Theory", A. W. Snyder and J. D. Love, Chapman and Hall, London and New York, 1983, and, "Physical Interpretation of Petermann's Strange Spot Size", C. Pask, Electronic Letters, Vol. 20, No. 3, February, 1984.

In the model used for the calculations herein, the measured cut off wavelength is defined as 93% of the calculated cut off wavelength. The wavelength dependence of the refractive index of germania doped silica was taken from, "Refractive Index Dispersion of Doped Fused Silica", S. Kobayashi et al., Conference Publication from IOOC, 1977, paper B8-3.

The profile species investigated were of the simple, two and three region type, to meet the additional requirements of ease of manufacture and limited residual stress in the waveguide fiber.

Figure 2:
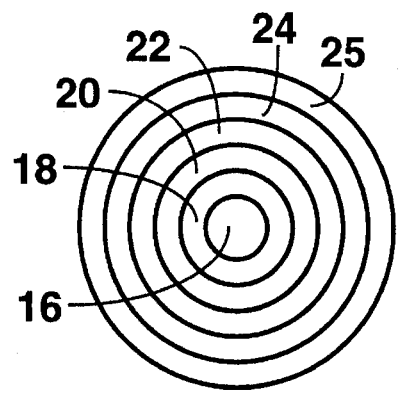
FIG. 2 is an end view of the inventive waveguide fiber showing the central core, the surrounding glass layers and the outside polymer layers.

FIG. 2 is a cross section of the inventive waveguide fiber showing the central core region 16, the first annular core region 18 and the second annular core region 20. The final glass layer is the clad layer 22. The first and second polymer layers are shown as 24 and 25. DSM Desotech Incorporated, 1122 St. Charles Street, Elgin, Ill.

Figure 3:
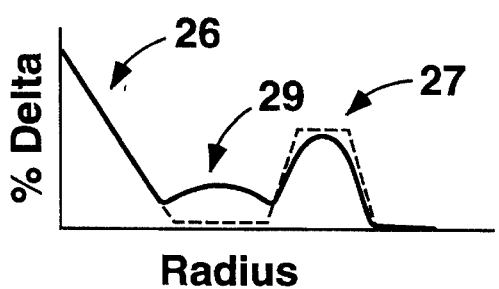
FIG. 3 is an embodiment of the invention wherein the central core has an alpha profile with alpha=1.

The particular embodiment of the inventive profile illustrated in FIG. 3, has a triangular central profile (an alpha profile with alpha=1) 26 and a substantially symmetric second annular core region 27 having a profile of general trapezoidal shape. Region 27 is alternatively shown as rounded because the manufacturing process and diffusion of the dopant tends to smooth sharp transitions in dopant concentration. The first annular region 29 may have a flat profile as indicated by the dashed line or have a profile slightly rounded at the center or at either end. For modelling purposes, the profile in region 29 was taken to be substantially flat and to have a % delta in the range 0.0 to 0.10.

Figure 4:
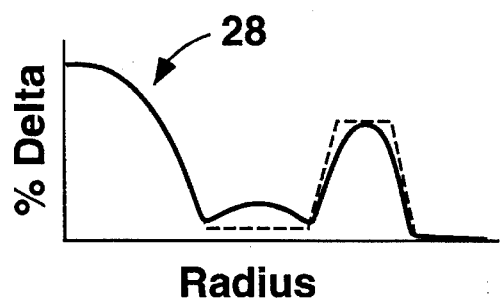
FIG. 4 is an embodiment of the invention wherein the central core has an alpha profile with alpha=2.

A second alpha profile embodiment is that with alpha=2 as illustrated by central core profile 28 in FIG. 4. The first and second annular regions of FIG. 4 are essentially identical to those of FIG. 3.

FIG. 5 illustrates an embodiment of the inventive profile wherein the central core region is essentially the step 30. The first and second annular core regions are essentially as shown in FIG. 3 except that the limits of % delta in the first annular region are in the range 0.0 to 0.20.

Table 1 shows the ranges of the respective profile variables which yield waveguides having the targeted properties noted above. The profile variables of every waveguide which met the specified properties were found to be within the ranges shown in the tables. However, only about 30% of the profiles defined by the tabulated ranges were found to have the required properties. That is, the ranges in Table 1 represent necessary but not sufficient conditions for the profile variables.

TABLE 1

|  | Triangular Central Core | Alpha = 2 Central Core | Step Central Core |
| --- | --- | --- | --- |
| Maximum Central Core % Delta | 0.77–1.00 | 0.80–0.95 | 0.75–1.05 |
| Maximum First Annulus % Delta | 0.0–0.1 | 0.0–0.1 | 0.0–0.2 |
| Maximum Second Annulus % Delta | 0.1–0.5 | 0.1–0.5 | 0.1–0.5 |
| Radius Central Core (microns) | 2.6–3.4 | 2.4–2.8 | 1.4–2.2 |
| Second Annulus Radius (microns) | 4.25–7.25 | 4.25–6.25 | 4.25–5.75 |
| Second Annulus Width (microns) | 0.4–2.0 | 0.4–2.0 | 0.4–2.0 |
| Inner Profile Volume | 2.76–3.92 | 2.70–3.80 | 2.76–3.68 |
| Outer Profile Volume | 1.47–7.19 | 1.10–6.86 | 1.54–6.82 |
| Ratio Outer Volume/Inner Volume | 0.51–2.33 | 0.33–2.17 | 0.56–1.99 |

Example 1. Model Results for Triangular Central Core

The following profile parameters were entered into the model for calculating waveguide properties:

Maximum central core % delta—0.87%;

Maximum first annulus % delta—0.1%;

Maximum second annulus % delta—0.3%;

Central core radius (extrapolated intersection of index profile with x-axis)—3.0 microns;

Second annulus radius (measured to the center of the annulus base)—5.5 microns; and, Second annulus width (measured at the one half value of index profile)—0.9 microns.

The example profile is shown in FIG. 6. Corresponding with the definitions provided in FIG. 1, the central core radius, 34, and the second annulus radius, 40, are shown. The first annulus has a substantially constant index profile. The index profile of the second annulus is trapezoidal in shape. The model accounts for diffusion of dopant out of the waveguide along the centerline by including region 32 as part of the central core.

The calculated properties of the waveguide are:

Zero dispersion wavelength—1564 nm;

Dispersion slope—0.080 ps/nm$^2$-km;

Modefield diameter—8.43 microns; and

Cut off wavelength—1137 nm.

The inner profile volume, outer profile volume and the outer to inner volume ratios were calculated to be, 1.60 units, 1.58 units and 0.99, respectively.

The calculated properties fit well with the high performance system requirements listed above.

In the course of multiple calculations of waveguide properties from index profile models, 120 profiles having a triangular central core region, 65 profiles having an alpha=2 central core region, and 23 profiles having a step central core region were found which met the high performance system specifications.

A profile was modelled which had the same general shape as that in FIG. 6. The maximum core % delta was 0.79%, maximum second annular region delta 0.44%, first annular region % delta 0.0%, central core radius 3.44 microns, second annulus radius, measured to the center of the annulus, 7.5 microns and width of second annulus 0.93 microns. This profile yielded the properties:

Mode field diameter—8.5 microns;

zero dispersion wavelength—1565 nm;

Dispersion slope—0.065 ps/nm$^2$-km;

Cut off wavelength—1525 nm;

Inner profile volume—1.78 units;

Outer profile volume—3.29 units; and,

Outer to inner volume ratio—1.85.

Again the calculated waveguide properties show an excellent fit with target properties.

Example 2. Manufacturing Results

A large number of kilometers of waveguide fiber was manufactured substantially in accordance with FIG. 6. The centerline index dip was about the same as that shown in the modelled profile and the transition regions between central core and first annulus, first and second annulus and second annulus and clad layer were rounded due to diffusion of dopant from high to low concentration regions.

The resulting fiber had:

average maximum % delta—0.814;

average maximum % delta for the second annulus—0.289;

average ratio $a_0/a$—0.39; and, average ratio $a_1/a$—0.89.

The central core region was an alpha profile with alpha about 1. The % delta index of the first annular region was less than about 0.1.

Average waveguide properties were measured to be:

mode field diameter—8.45 microns;

zero dispersion wavelength—1563 nm;

dispersion slope—0.076 ps/nm$^2$-km; and, cut off wavelength—1200 nm. The attenuation was typically less than 0.21 dB/km and the polarization mode dispersion was typically less than 0.15 ps/km$^{1/2}$. These are well within the stated target ranges for properties of waveguides for high performance systems.

A profile having a single annulus is shown in FIG. 7. Central core region 44 may have a general shape or it may be an alpha profile with alpha at least 1. The annulus 46 is substantially flat and has a radius 48 no greater than about 7 microns. Table 2 shows the ranges explored for three profiles having a single annular region.

TABLE 2.

| | Triangular Central Core | Alpha = 2 Central Core | Step Index Central Core |
|---|---|---|---|
| Central Core % Delta | 1.02–1.10 | 0.90–1.10 | 0.75 |
| Annulus % Delta | 0.08–0.12 | 0.08–0.16 | 0.08–0.12 |
| Central Core Radius (microns) | 2.4–2.6 | 1.8–2.4 | 1.8–2.0 |
| Annulus Radius (microns) | 5.0–8.0 | 4.0–8.0 | 4.0–8.0 |
| Inner Profile Volume | 2.98–3.38 | 2.74–3.48 | 2.84–3.18 |
| Outer Profile Volume | 1.34–6.62 | 0.96–6.62 | 0.96–4.42 |
| Outer/Inner Volume Ratio | 0.45–2.19 | 0.33–2.15 | 0.34–1.39 |

While the model shows that acceptable product may be obtained using either the profile of FIG. 6 or FIG. 7, manufacturing has for now focused on the profile of FIG. 6. Excellent reproducibility and ease of manufacturing has been demonstrated using the FIG. 6 profile.

Although specific embodiments and features of the invention have hereinbefore been disclosed, the invention is nonetheless limited only by the following claims.

What is claimed is:

1. A single mode optical waveguide fiber designed for high data rate, single channel or WDM telecommunications systems comprising:

a core region comprising, a central region, having a maximum index of refraction $n_0$, a first annular region, adjacent said central region, having a maximum index of refraction $n_1$, and, a second annular region, adjacent said first annular region, having a maximum index of refraction $n_2$, wherein $n_0 > n_2 > n_1$; and, a clad layer, surrounding said core region, having an index of refraction $n_c$, wherein $n_2 > n_c$;

said core region having an inner and an outer profile volume, wherein said inner profile volume is in the range of about 2.70 to 3.95 units and said outer profile volume is in the range of about 1.10 to 7.20 units and the ratio of said outer to said inner profile volume is in the range of about 0.30 to 2.35; and, said optical waveguide fiber having a first polymeric coating layer adjacent said clad layer having an elastic modulus in the range of about 1.0 to 3.0 MPa and a glass transition temperature less than about −10° C., and a second polymeric coating adjacent said first coating layer having an elastic modulus no less than about 400 MPa.

2. The single mode optical waveguide of claim 1 wherein the glass transition temperature of said inner coating layer is about −35° C.

3. The single mode optical waveguide of claim 2 wherein the elastic modulus of said outer coating layer is no greater than about 1600 MPa.

4. The single mode optical waveguide of claim 1 wherein the relation between refractive index and radial position in said central core region is an alpha profile.

5. The single mode optical waveguide of claim 4 wherein said alpha profile has an alpha value of 1, said core having a radius a, said central core region having a radius $a_o$, and said second annular region having an inner radius $a_1$, wherein the ratio $a_o/a$ no greater than about 0.4 and $a_1/a$ is about 0.9.

6. The single mode optical waveguide of claim 4 wherein said alpha profile has an alpha value of 2.

7. The single mode optical waveguide of claim 1 wherein the refractive index of said central region is essentially constant.

8. A single mode optical waveguide fiber designed for high data rate, single channel or WDM telecommunications systems comprising:
  a core region comprising,
    a central region, having a maximum index of refraction $n_0$,
    a first annular region, adjacent said central region, having a maximum index of refraction $n_1$, and,
    a second annular region, adjacent said first annular region, having a maximum index of refraction $n_2$, wherein $n_0>n_2>n_1$; and,
  a clad layer, surrounding said core region, having an index of refraction $n_c$, wherein $n_2>n_c$;
    said central region having an alpha profile wherein alpha is greater than 1;
    said first annular region having an essentially constant refractive index profile; and,
    said optical waveguide fiber having an inner and an outer profile volume, wherein said inner profile volume is in the range of about 2.70 to 3.80 units and said outer profile volume is in the range of about 1.10 to 6.90 units and the ratio of said outer to said inner profile volume is in the range of about 0.30 to 2.20.

9. The single mode optical waveguide fiber of claim 8 wherein,
  said central region has an alpha of about 2, a % delta in the range of about 0.80 to 0.95, and a radius in the range of about 2.4 to 2.8 microns,
  said first annular region has a % delta no greater than about 0.1,
  said second annular region has a % delta in the range of about 0.1 to 0.5, a radius, measured to the center of said second annular region, in the range of about 4.25 to 6.25 microns, and a width, measured at the one half % delta level, of about 0.4 to 2 microns, and,
  said respective inner profile volume, outer profile volume and outer to inner profile volume ratio are in the ranges of about 2.70 to 3.80 units, 1.10 to 6.90 units, and 0.30 to 2.20.

10. The single mode optical waveguide fiber of claim 8 wherein,
  said central region has an alpha of infinity, a % delta in the range of about 0.75 to 1.05, and a radius in the range of about 1.4 to 2.2 microns,
  said first annular region has a % delta no greater than about 0.2,
  said second annular region has a % delta in the range of about 0.1 to 0.5, a radius, measured to the center of said second annular region, in the range of about 4.25 to 5.75 microns, and a width, measured at the one half % delta level, of about 0.4 to 2 microns, and,
  said respective inner profile volume, outer profile volume and outer to inner profile volume ratio are in the ranges of about 2.75 to 3.70, 1.55 to 6.85, and 0.55 to 2.00.

11. A single mode optical waveguide fiber designed for high data rate, single channel or WDM telecommunications systems comprising:
  a core region comprising,
    a central region, having a maximum index of refraction $n_0$,
    a first annular region, adjacent said central region, having a maximum index of refraction $n_1$, and,
    a second annular region, adjacent said first annular region, having a maximum index of refraction $n_2$, wherein $n_0>n_2>n_1$; and,
  a clad layer, surrounding said core region, having an index of refraction $n_c$, wherein $n_2>n_c$;
    said core region having an inner and an outer profile volume, wherein said inner profile volume is in the range of about 2.70 to 3.95 units and said outer profile volume is in the range of about 1.10 to 7.20 units and the ratio of said outer to said inner profile volume is in the range 0.30 to 2.35; and,
    said waveguide fiber having a mean mode field diameter of about 8.4 microns, a zero dispersion wavelength in the range of about 1560 to 1575 nm, a dispersion slope no greater than about 0.09 ps/nm²-km, and a polarization mode dispersion no greater than 0.15 ps/km$^{1/2}$.

12. A single mode optical waveguide fiber designed for high data rate, single channel or WDM telecommunications systems comprising:
  a core region comprising,
    a central region, having a maximum index of refraction $n_0$,
    an annular region, adjacent said central region, having an outside radius $a_1$ in the range of about 4 to 7 microns and a substantially constant refractive index of % index delta no greater than about 0.16; and,
  a clad layer, surrounding said core region, having an index of refraction $n_c$, wherein $n_1>n_c$;
    said waveguide fiber having a mean mode field diameter of about 8.4 microns, a zero dispersion wavelength in the range of about 1560 to 1575 nm, a dispersion slope no greater than about 0.09 ps/nm²-km and a polarization mode dispersion no greater than 0.15 ps/km$^{1/2}$.

13. The single mode optical waveguide of claim 12 wherein the relation between refractive index and radial position in said central core region is an alpha profile wherein alpha is at least 1.

* * * * *